United States Patent
Herbstman et al.

[11] Patent Number: 6,084,597
[45] Date of Patent: Jul. 4, 2000

[54] METHOD FOR CONCATENATED RENDERING OF DIGITAL IMAGES

[75] Inventors: David F. Herbstman, Seattle, Wash.; David P. Simons, Lynnfield, Mass.; Daniel M. Wilk, Seattle, Wash.

[73] Assignee: Adobe Systems Incorporated, San Jose, Calif.

[21] Appl. No.: 08/693,476

[22] Filed: Aug. 8, 1996

Related U.S. Application Data

[63] Continuation of application No. 08/693,944, Aug. 7, 1996.

[51] Int. Cl.[7] .................................................. G06T 11/00
[52] U.S. Cl. ............................................................ 345/435
[58] Field of Search ..................................... 345/435, 433, 345/436, 437, 474, 475

[56] References Cited

PUBLICATIONS

Alpert et al. "The EFX Editing and Effects Enviroment" IEEE Multimedia pp. 15–29, Spring 1996.

*Primary Examiner*—Almis R. Jankus
*Attorney, Agent, or Firm*—Fish & Richardson P.C.

[57] ABSTRACT

A computer-implemented method for delaying the rendering of source material associated with a source layer in a nested composition that is a layer in a root composition. During the rendering of the root composition the method retrieves the source layer, promotes the source layer to the root layer and delays the rendering of the source material until the root layer is rendered.

16 Claims, 5 Drawing Sheets

METHOD FOR CONCATENATED RENDERING OF DIGITAL IMAGES

This application is a continuation of U.S. application Ser. No. 08/693,944, filed Aug. 7, 1996.

BACKGROUND

The present invention relates generally to computer animation systems and more particularly to a method and apparatus for delaying the rendering of nested composition layers.

Programmed computers can be used to edit and create movies. For example, a computer program product called After Effects, available from Adobe Systems Incorporated of Mountain View, Calif., is licensed for use on a variety of personal computers and provides its user the ability to edit and create movies by integrating and arranging pieces of footage. In such programs, the process of creating a movie typically occurs in two major stages: modeling and rendering.

Modeling is the process of creating the structure for a movie project, commonly called a "composition", by defining the arrangement and timing of imported footage. A composition is essentially a set of instructions that define the processing of footage pieces in space and time in the formation of a movie. Each composition typically includes the definition of one or more layers, which are place holders for pieces of footage. Modeling includes the sub-processes of importing footage into the layers in a composition, editing the footage, arranging or "compositing" the various pieces of footage, and adding animation or other effects to the composition layers.

Imported footage may be in the form of video, pictures, animations, drawings, stills, photographs, computer generated images, or other compositions. Accordingly, a composition may include single sampled images and other compositions (nested compositions) as individual layers resulting in complex hierarchical composites.

Each piece of imported footage is assigned to a layer. Compositing integrates or combines the footage of the respective layers by using geometry masks, transparency information and effects. As the layers of the composition are integrated in the composition, animation and other effects are applied to each layer.

To create a final output, such as a film or videotape for viewing, the composition must be rendered. The rendering process transforms the footage and instructions associated with each layer into finished video frames. During the rendering process, corresponding pixels from each layer are composited on top of each other to create a final image, a frame at a time, in the output format requested by the user. Compositions are rendered using a fixed rendering order. For each layer in a composition the following steps are performed: (1) a source image is retrieved; (2) as appropriate, the source image is cut or clipped according to a mask to define that portion of the source image which is to be visible in the display space; (3) the clipped image is processed according to the designated image processing routines; (4) the processed image is transformed according to the geometric properties associated with the respective layer (e.g., position, rotation and scale); and (5) the transformed image is blended with previously rendered layers in the composition to form a composite image.

SUMMARY OF THE INVENTION

In general, in one aspect, the invention provides a computer-implemented method for rendering nested compositions to delay the rendering of the layers of a nested composition until the time for rendering the root composition in which the nested composition resides. The invention determines if the blending of the nested composition into the root composition is an associative operation, and, if so, determines if the nested composition's layer in the root composition includes pixel manipulation operations. If no pixel manipulation operations are present, the invention delays the rendering of the layers of the nested composition, promotes the layers into layers of the root composition and renders the promoted layers as layers of the root composition.

Advantages of embodiments of the invention include the following. Image quality of both sampled and outline data may be maintained even in deep hierarchial composition structures. Source data associated with a lower level layer in a nested composition may need to be sampled only one time during the rendering process. Repetitive sampling of the source data is avoided by promoting the layer into a higher level composition, where the source material is retrieved a single time. Similarly, outline data may similarly be benefited allowing the rasterization of the outline data to occur at the root composition level. Again, repetitive sampling of the rasterized data is avoided by promoting the layer into a higher level composition, where the source material is retrieved a single time.

In addition, source footage information may be maintained up to the actual rendering of the promoted layer in a higher level composition. Ordinarily, source footage information is lost at each composition level. For example, footage that ordinarily would be chopped, clipped or otherwise formatted at a nested composition level due to the format preferences associated with the nested composition, may be maintained at the source level and fully exploited in the root composition into which is it promoted and ultimately rendered.

Other advantages and features will be apparent from the following description and from the claims.

DETAILED DESCRIPTION

Figure 1:
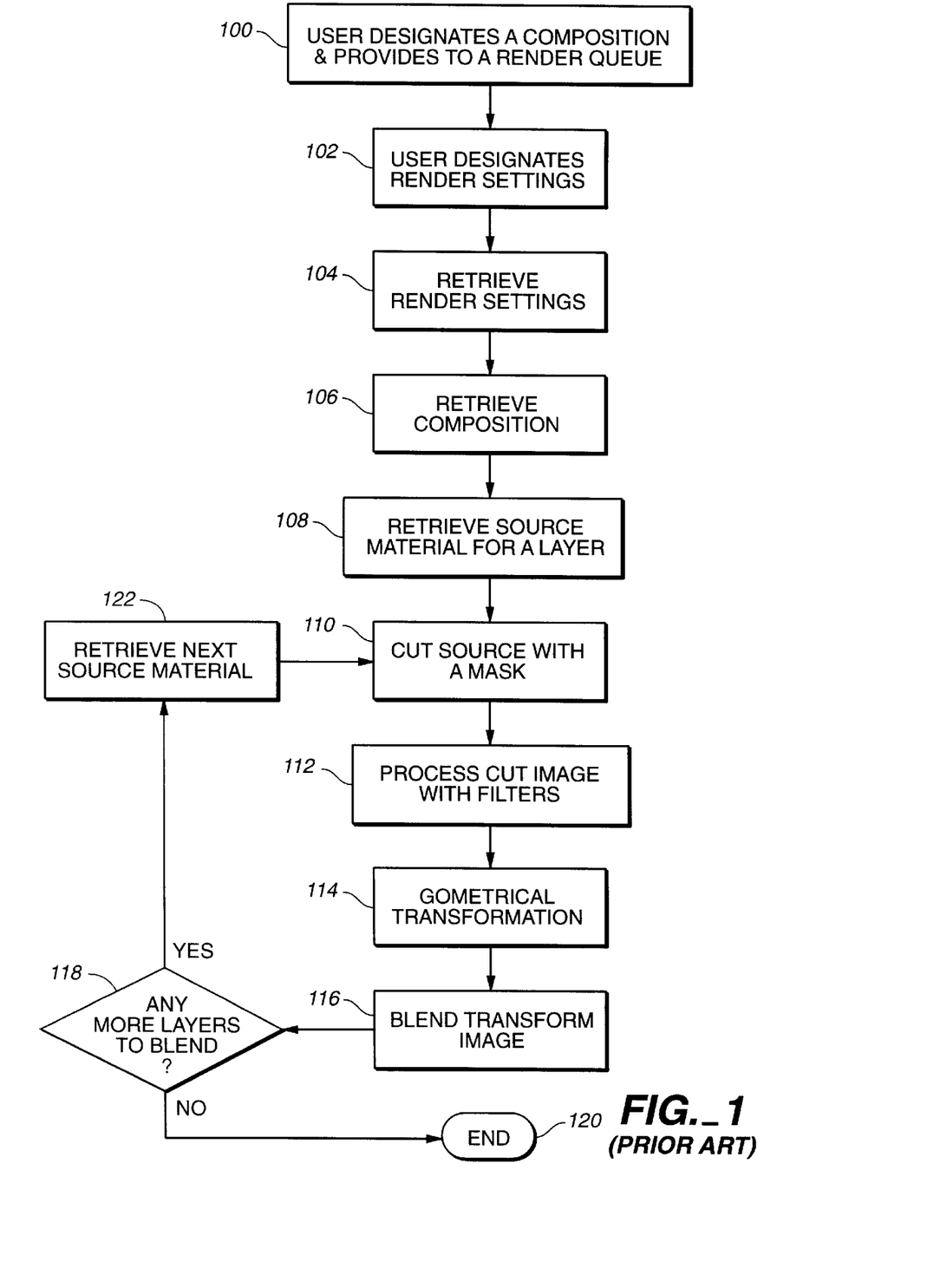
FIG. 1 is a flow chart of a prior art rendering process for a composition.

Referring to FIG. 1, in a process of rendering a composition implemented in a composition system, a user designates a composition for rendering and adds it to a render queue (100). The user designates a set of render settings and output formats that will control the rendering operation and the format of the output files created during the rendering process (102). When the composition reaches the top of the render queue, the system retrieves the render settings designated by the user including the output format information (104) and it retrieves the composition (106).

Beginning with the back-most layer, the system retrieves the source material for a single layer (108). The source material may be images or footage in a digitized raster form or it may be outline data that is to be rasterized in the composition process. The system then cuts the source material with a mask that selects the image data that is to be displayed in the composition (110).

The system processes the cut image using image processing effects or filters according to user-selected imaging options (112). Such systems typically provide a wide range of effects for a user to choose from, as well as allowing the user to add plug-ins that provide even more effects. After all of the effects have been applied to the cut image, the system geometrically transforms the result according to the geometry properties and operations associated with the layer (114). Specifically, the system may rotate, scale, position or otherwise manipulate the geometry of the layer in this step. The system may also compensate for differences in source and destination pixel aspect ratio as disclosed in a commonly-owned U.S. patent application entitled "Transforming Images With Different Pixel Aspect Ratios", filed Aug. 7, 1996, which is incorporated here by this reference. Then, the system blends the result with any previously rendered layers, overlapping or otherwise blending the pixels on a pixel by pixel basis to form a composite image (116).

The remaining layers in the composition are processed in render order (from back to front) according to the same steps 108 through 116 until the composite image is complete (118–122).

When one or more of the layers of a composition (root composition) is itself a composition (nested composition), prior art systems rendered the nested composition by retrieving and rendering the entire nested composition immediately to create a completed composite image. The source material for the first (back-most) underlying layer in the nested composition was retrieved, cut, filtered, transformed and blended according to the properties of the underlying layer. Then, the succeeding underlying layers were retrieved, operated on, and blended into a composite image until a final composite image was derived from the blending of the last retrieved image data and the composite image formed from the previously rendered underlying layers. The composite image created from the underlying layers was then itself rendered according to the layer properties and geometric transformations associated with the nested composition layer in the root composition.

Adhering to such a strict bottom-to-top render ordering may result in degradation of image quality as composition nesting hierarchy deepens. Each rendering may require an computationally expensive (and possibly quality-reducing) image resampling step. Moreover, certain operations are not invertible once the resulting pixels have been computed. For example, an image may have to be scaled to accommodate the format selected for its nested composition. Accordingly, while a root composition may not contain scale limitations, the source material (the composite image derived from rendering the nested composition) that is presented at the root level may contain scaled images. Consider the following example, in which a composition A includes a layer which is itself a composition B. If a layer in composition B is scaled to fit a certain display area in composition B (say 640 by 480), the image quality may be reduced to conform to the display space, effectively losing some of the data associated with the source material (assume, for example, the source material is in a 800 by 600 format). Assume also that the layer in composition A to which composition B is assigned has associated with it a scale to a larger display space than that of composition B (800 by 600). In an ordered rendering system, the image data which was scaled down to accommodate limitations in composition B, will in turn have to be scaled up to accommodate the scale in composition A. Performing these operations will typically compromise image quality.

Figure 2:
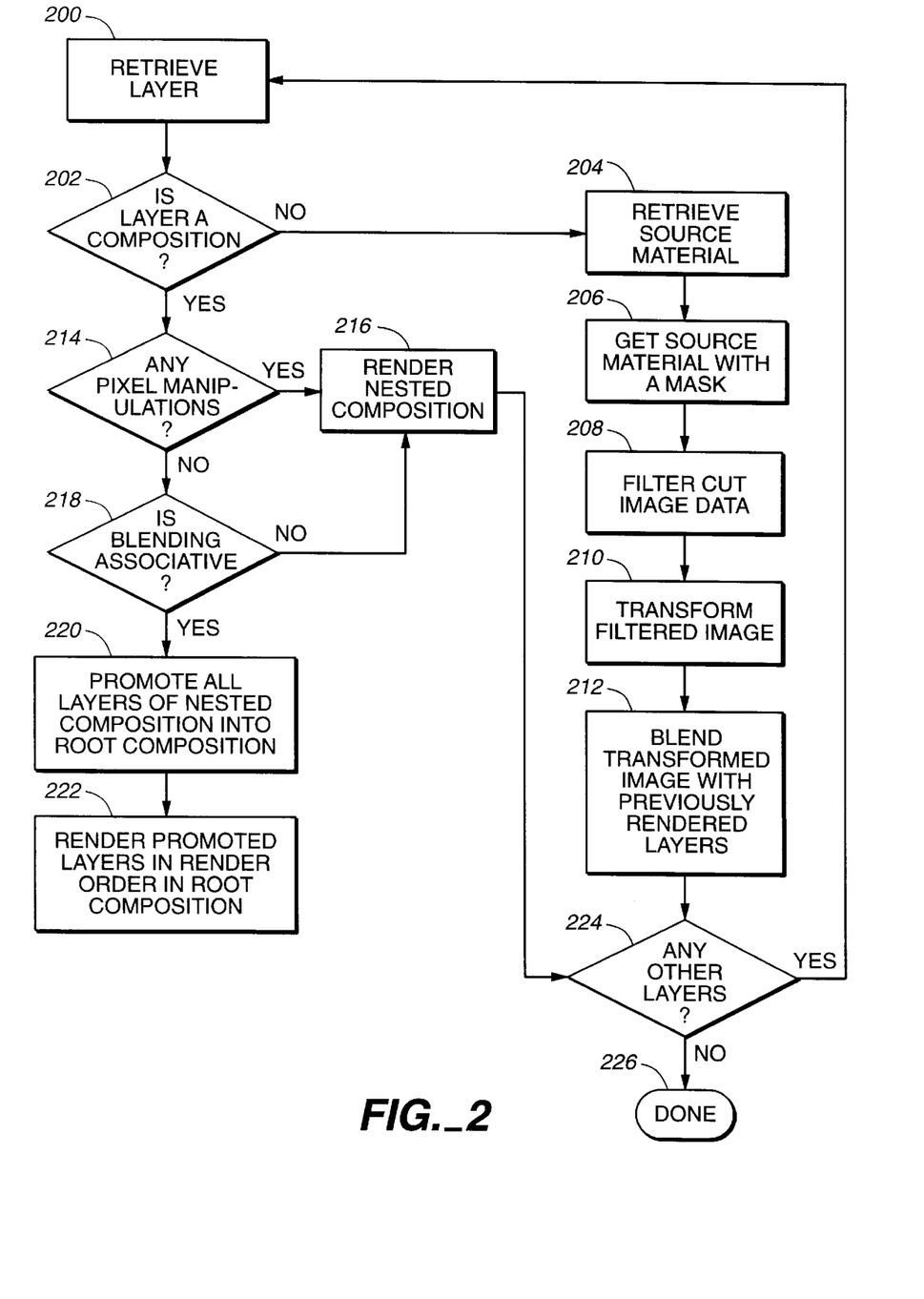
FIG. 2 is a flow chart for a method of promoting the layers in a nested composition into a higher level composition according to the present invention.

Referring to FIG. 2, in a method for rendering a composition, the system retrieves a layer in the composition (200) and determines if the layer itself is a composition (202). If the layer is not a composition, the system renders the layer immediately by retrieving the source material (204), cutting the source material with a mask (206), filtering the cut data with image processing filters (208), transforming the filtered image using the geometric transforms designated for the layer (210), and blending the result with any previous rendered layers to form a composite image (212).

If the retrieved layer is itself a composition (i.e., a nested composition), the system determines whether any pixel manipulation operations are designated in the image processing (filtering) operations for the layer in the root composition associated with the nested composition (214). If a pixel manipulation operation is designated for the nested composition's root layer, the nested composition is rendered as has been described (216). In other words, the underlying layers in the nested composition are rendered according to the basic rendering steps set out in steps 204 through 212.

In an alternative embodiment, whether the presence of a particular pixel manipulation operation causes the "yes" branch to be taken at decision step 214 is determined individually for each pixel operation. A system may recognize a color correction operation, for example, as not requiring the "yes" branch to be taken at step 214.

At decision step 218, the system determines whether the blending operation associated with the nested composition's layer in the root composition is an associative operation (218). For example, referring to FIG. 3a, in a composition A that has layers one, two, and three, and where layer two is itself a composition (composition B), a check is made of the blending mode associated with layer two, which indicates how layer two is to be blended with layers one and three in the root composition (composition A). If the blending is an associative operation, then all of the layers of the nested composition (in this example, layers four and five of composition B) are promoted into the root composition for the rendering process (220). The term "associative" is used in its algebraic sense: the blending of a given layer with other layers in a composition is associative if its operation is unaffected by the grouping of the layers.

When promoted, each layer in the nested composition becomes a layer in the root composition. The process of promoting a layer is described further in reference to FIG. 3.

At step 222 (FIG. 2), the promoted layers are rendered in render order in the root composition by performing the five basic rendering steps of retrieving the source material, cutting the source material, filtering the cut source material, transforming the filtered image data and ultimately blending the geometrically transformed image into a composite image associated with the root composition, which have been described as steps 204–212.

If the test at step 218 fails, the nested composition is rendered at step 216, as has been described. After the nested composition is rendered, the remaining layers in the composition are processed in the same fashion (224, 220, 226).

Figure 3A:
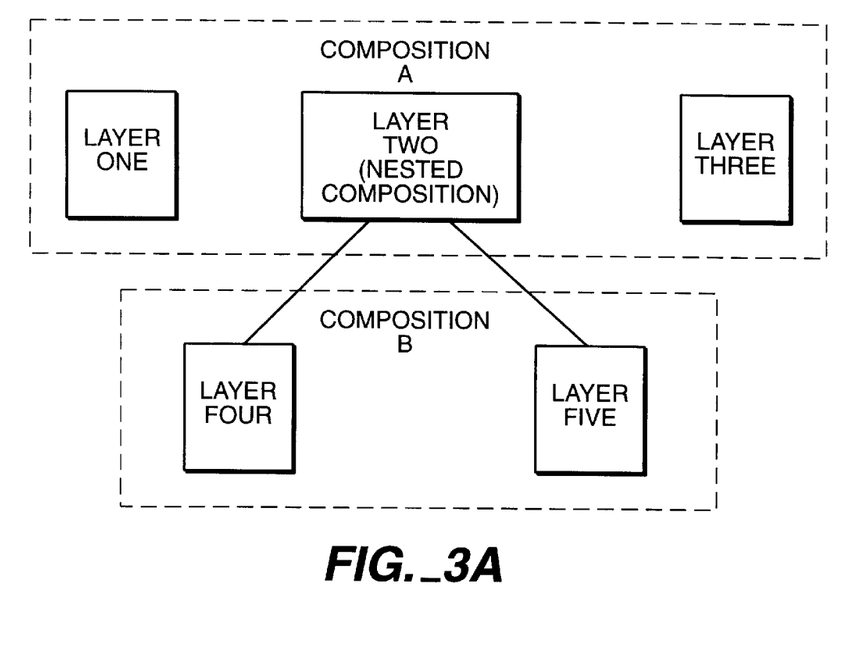
FIG. 3a is a schematic block diagram of the structure of a composition that includes a nested composition as a layer.

Referring to FIG. 3a, the rendering process will be described for a specific example in which a composition A includes a sequence of three layers (one, two, and three) of which the second layer is a nested composition B having two layers (four and five). When composition A is to be rendered, the render setting information and a first layer (layer one) are retrieved. Because layer one is not a composition, it is rendered without delay. At the completion of the rendering of layer one, a composite image is stored (accumulated) for blending with other images that will be derived from the remaining layers in composition A.

The system then turns to layer two. Since layer two is a nested composition, the system determines whether any pixel manipulation operations occur in any of the image processing (filtering) operations for the nested composition's root layer (layer two). If not, a check is made to determine if the blending operation associated with layer two in composition A is an associative operation. If it is, all of the layers of the nested composition B are promoted into composition A for the rendering process, resulting in the new composition of FIG. 3b. The promoted layers are rendered in render order in the root composition, composition A, by rendering the first promoted layer (layer four) followed by any other promoted layers (layer five). Finally, the system renders the last layer in the composition (layer three).

Figure 3B:
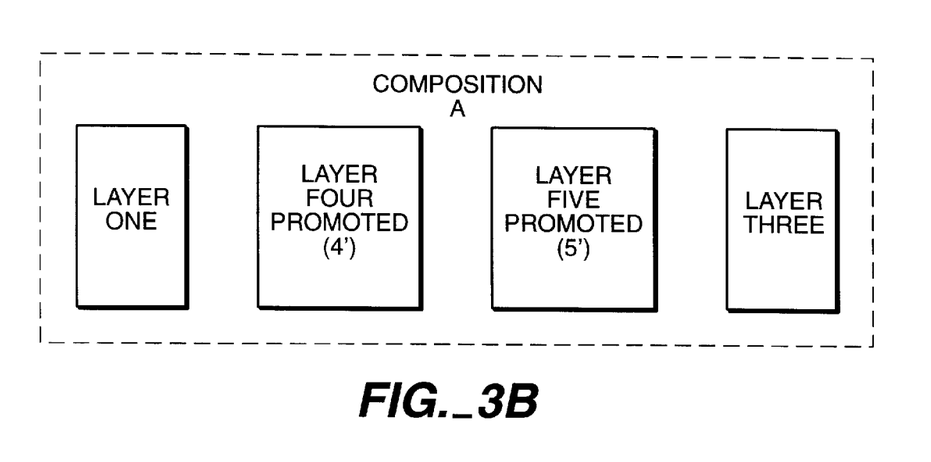
FIG. 3b is a schematic block diagram of the structure of a composition into layers from a nested composition have been promoted according to one embodiment of the present invention.

Associated with each layer in composition A and composition B are non-geometric operations and geometric operations, each of which are applied sequentially to the source material associated with the layer to transform the source material in the course of the rendering operation. Non-geometric operations include the cutting of the source material with masks as well as any filtering operations (effects). The rendering process for each layer can be divided into four parts: (1) retrieving the source material associated with a given layer (step 204); (2) applying the non-geometric operations to the source material (steps 206 and 208); (3) applying the geometric operations to the images produced in step (2)(step 210); and finally, blending the geometrically transformed image from step (3) with other previously rendered images to form a composite image (step 212).

Figure 4:
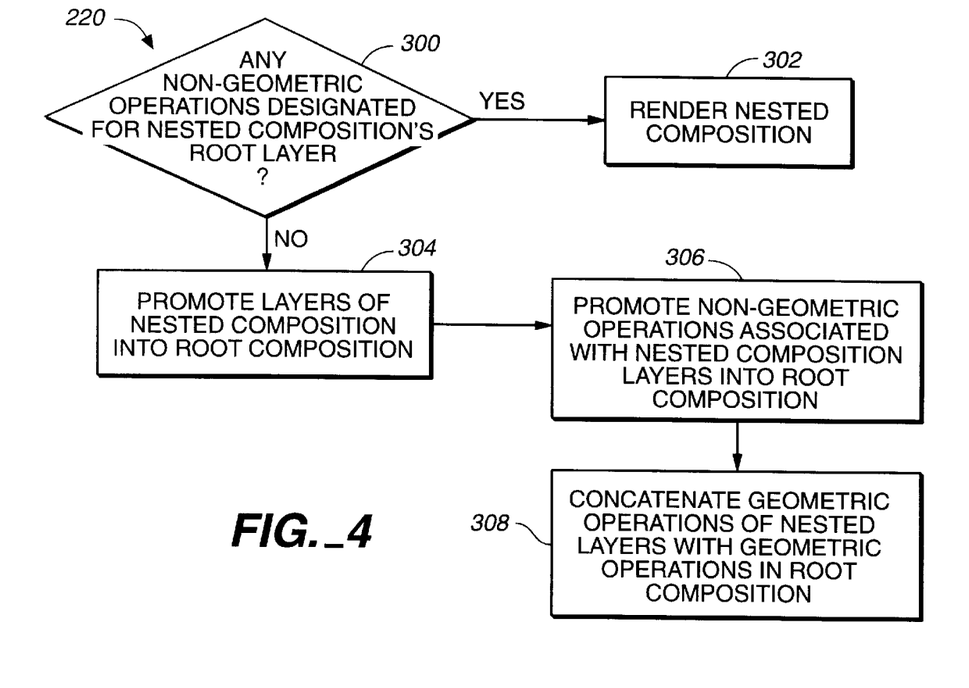
FIG. 4 is a flow chart of a method of promoting layers of a nested composition.

Referring now to FIGS. 3a, 3b and 4, in the process of promoting the layers of a nested composition (step 220), the system determines if any non-geometric operations are designated for the root layer associated with the nested composition (300). Accordingly, in our example, when the system has determined that the layers of composition B meet the basic tests for promotion (214 and 218, FIG. 2), the system checks if any non-geometric operations are designated for layer two in composition A. If any non-geometric operations are designated, then the nested composition is rendered and no promotion of layers occurs (302).

If no non-geometric operations are designated, then the layers of the nested composition are promoted into the root composition (304) and any non-geometric operations designated for the layers in the nested composition are similarly promoted into their respective promoted layers in the root composition (306). Accordingly, in our example, assuming layer two has no non-geometric operations, layer four and layer five will be promoted into composition A (now designated layer 4' and layer 5' in composition A), as is shown in FIG. 3b, and the non-geometric operations originally associated with layer four and layer five will likewise be promoted and associated with the new layers 4' and 5' in composition A. In addition, the geometric operations associated with the layers of the nested composition B will each be concatenated (composed) with the geometric operations associated with the nested composition's root layer, resulting in a singular geometric operation to be applied to each respective promoted layer (308). Specifically, in our example, the geometric operations associated with layer two will be concatenated with the geometric operations associated with layer four resulting in a singular geometric operation to be associated with promoted layer 4'. In one embodiment of the invention, the geometric transformation is represented as a three by three matrix. Each matrix describes the geometric manipulations in terms of position, rotation, skew and scale. The concatenation step combines the matrices to yield a composite matrix that represents the geometric manipulations to be performed on the promoted layer. Similarly, the geometric operations associated with layer two will be concatenated with the geometric properties of layer five resulting in a singular geometric operation to be associated with promoted layer 5'.

The process of rendering the promoted layers for the example is as follows. The source material for layer 4' is retrieved. The non-geometric operations designated for layer 4' (the non-geometric operations originally designated for layer four) are applied to the source material. Thereafter, the geometric operations designated for layer 4' (the resultant of concatenating the geometric operations associated with layers two and four) are applied to the image. Finally, the geometrically transformed image is blended with the composite image derived from the rendering of layer one, and stored as a composite image. Thereafter, layer 5' is rendered in a similar fashion and the resultant image is blended with the composite image stored in association with the rendering of layer 4'.

In an alternative embodiment, the non-geometric operations associated with the nested composition's layer in the root composition are evaluated to determine if the application of the non-geometric operations are transparent to the application of the geometric operations of the nested composition layer. If so, then the non-geometric operations associated with the nested composition's layer in the root composition are added to the set of non-geometric operations associated with the nested composition layer which is being promoted to form a super-set of non-geometric operations to be applied to the source material prior to application of the concatenated geometric operations. In terms of the example, the non-geometric operations designated for layer two are evaluated to determine if their application is transparent to the application of the geometric operations of layer four. If so, then the non-geometric operations designated for layer two in the root composition are added to the set of non-geometric operations designated for layer four to form a super-set of non-geometric operations to be applied to the source material prior to application of the concatenated geometric operations.

Figure 5:
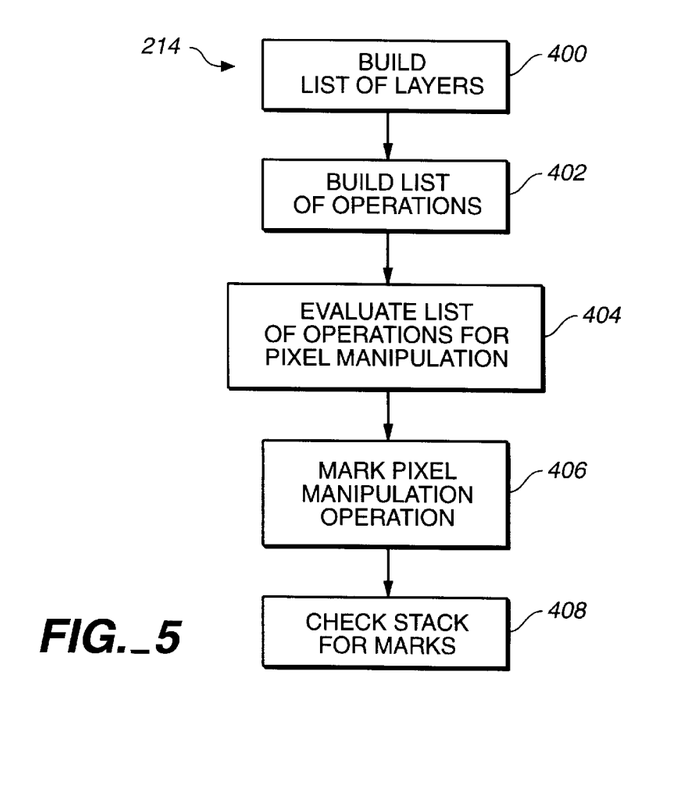
FIG. 5 is a flow chart of a method of evaluating a layer to determine if pixel manipulations are present in the layers of a nested composition according to the present invention.

Referring to FIG. 5, to determine whether any pixel manipulation operations are designated for a layer (214), the system builds a list of the layers in a composition (400) and a list of the operations associated with those layers (402). The system traverses the tree structure of composition layers and builds a stack that is a properly ordered list of the operations associated with the all the layers of the composition. The system identifies those operations that require pixel manipulation (404) and each position in the stack (or list) that requires a pixel manipulation operation is marked (406). At the time for rendering a nested composition, the stack is checked to determine if any operations have been marked (408). The marking information of the tree structure may be used to collapse multi-level nested compositions into higher level layers of the rendered composition.

The invention may be implemented in hardware, firmware or software, or a combination of the three. Preferably the invention is implemented in a computer program for a programmable computer having a processor, a data storage system, volatile and non-volatile memory and/or storage elements, at least one input device and at least one output device.

Figure 6:
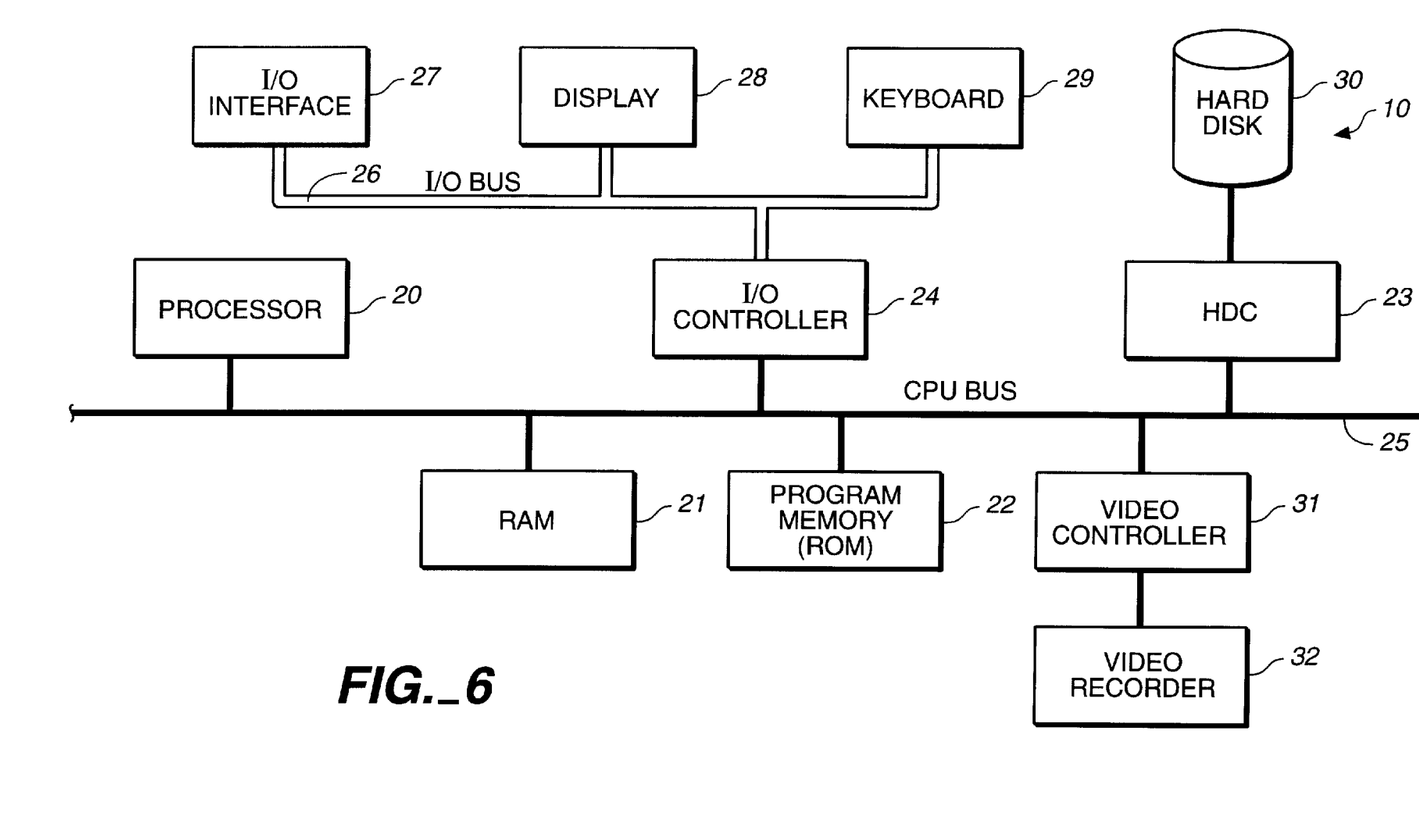
FIG. 6 is a schematic block diagram of a programmable computer suitable for executing computer programs according to the present invention.

By way of example, FIG. 6 shows a block diagram of a programmable processing system 10. Programmable processing system (computer) 10 preferably includes a processor 20, random access memory (RAM) 21, a program memory 22 (preferably a writable read-only memory (ROM) such as a flash ROM), a hard drive controller 23, video controller 31 and an input/output (I/O) controller 24 coupled by a CPU bus 25.

Hard drive controller 23 is coupled to a hard disk 30, which may be used for storing application programs, such as After Effects, and data including video. Video controller 31 is coupled to video recorder 32, which may be used for storing and importing video footage and for writing final output. I/O controller 24 is coupled by means of an I/O bus 26 to an I/O interface 27. I/O interface 27 receives and transmits data (e.g., stills, pictures, movies, and animations for importing into a composition) in analog or digital form over communication links such as a serial link, local area network, wireless link, and parallel link. Also coupled to I/O bus 26 is a display 28 and a keyboard 29. Alternatively, separate connections (separate buses) may be used for I/O interface 27, display 28 and keyboard 29. System 10 may be preprogrammed or it may be programmed (and reprogrammed) by loading a program from another source (e.g., a floppy disk, CD-ROM, or another computer).

Each computer program is preferably stored in a storage media or device (e.g., program memory 22 or a magnetic disk) readable by a general or special purpose computer, for configuring and operating the computer when the storage media or device is read by the computer to perform the procedures described in this specification. The invention may also be considered to be implemented as a computer-readable storage medium, configured with a computer program, where the storage medium so configured causes a computer to operate in a specific and predefined manner to perform the steps of the invention.

Other embodiments are within the scope of the following claims.

The present invention has been described in terms of specific embodiments, which are illustrative of the invention and not to be construed as limiting.

What is claimed is:

1. A computer-implemented method for rendering a nested composition having a plurality of layers, the nested composition defining a layer in a root composition, the method implemented to delay the rendering of the layers of the nested composition until the time for rendering the root composition in which the nested composition resides, the method comprising the steps of:

determining if the blending of the nested composition into the root composition is an associative operation;

if so, determining if the nested composition's layer in the root composition includes pixel manipulation operations;

if no pixel manipulation operations are present, delaying the rendering of the layers of the nested composition and promoting the layers into layers of the root composition; and rendering the promoted layers as layers of the root composition.

2. The method of claim 1 where the promoting step includes concatenating the layer properties of each individual layer in the nested composition with the layer properties associated with the nested composition in the root composition to derive a resultant set of layer properties for each promoted layer for use in the rendering of the promoted layer.

3. The method of claim 2 where the layer properties that are concatenated include geometry transforms, masks, and filters.

4. The method of claim 3 where the geometry transforms for each layer in a composition are stored as a matrix and where the concatenation of the geometry transforms results in the generation of a geometry transform for the promoted layer from the geometry transform matrices associated with the layer to be promoted and the root layer associated with the nested layer.

5. The method of claim 1 where the promotion step further includes the step of concatenating the geometric transforms for the nested layers in the nested composition with the geometric transforms associated with the layer in the root composition in which the nested composition resides.

6. The method of claim 5 where the promotion step further includes the steps of:

concatenating any masks for the nested layers in the nested composition with any masks associated with the layer in the root composition in which the nested composition resides;

concatenating any filtering operations for the nested layers in the nested composition with any filtering operations associated with the layer in the root composition in which the nested composition resides; and concatenating the geometric transforms for the nested layers in the nested composition with the geometric transforms associated with the layer in the root composition in which the nested composition resides.

7. The method of claim 1 further including the steps of evaluating if a cutting operation with a mask is defined for the root layer associated with the nested composition and if so, causing the immediate rendering of the nested composition, else promoting the layers of the nested composition into the root composition and using any mask associated with a nested composition layer as the mask for the promoted layer.

8. The method of claim 1 further including the steps of evaluating if a filtering operation is defined for the root layer associated with the nested composition and if so, causing the immediate rendering of the nested composition, else promoting the layers of the nested composition into the root composition and promoting any filtering operation associated with a nested composition layer to its respective promoted layer in the root composition.

9. The method of claim 1 wherein pixel manipulation operations include distortion, edge detection, blur, color correction, and painterly processing.

10. A method for rendering a composition comprising the steps of:

retrieving a layer form the composition;

determining if the layer defines a nested composition in the composition;

if it is, determining if any pixel manipulation operations are designated for the nested composition's layer in the composition;

if so, rendering the layer without delay;

otherwise, determining if a blending operation designated for blending the nested composition into the composition is an associative operation;

if not, rendering the layer without delay;

if otherwise, delaying the rendering by promoting all of the layers of the nested composition into the composition for the rendering process; and rendering the promoted layers in the composition.

11. The method of claim 10 where the step of rendering a layer further comprises the steps of retrieving the source material, cutting the source material with a mask, filtering the cut data with image processing filters, transforming the filtered image using geometric transforms designated for the layer, and blending the resultant transformed image with any previously rendered layers to form a composite image.

12. A method of delaying the rendering of a layer in a nested composition comprising the steps of:

determining if any pixel manipulation operations are designated for the nested composition's layer in a root composition;

if not, determining if the blending operation associated with the nested composition's layer in the root composition is an associative operation; and if it is, promoting all of the layers of the nested composition into the root composition for the rendering process and delaying the rendering of the promoted layers until called for by a render order in the root composition.

13. A method delaying the sampling of image format source material associated with a layer in a root composition during the rendering of the root composition, comprising the steps of:

retrieving a layer in the root composition;

determining if the layer is a composition;

if the layer is not a composition, sampling the image format source material associated with the layer and rendering the layer immediately;

if the layer is itself a composition, determining if any pixel manipulation operations are designated in the image processing for the layer in the root composition;

if a pixel manipulation operation is indicated, then sampling the image format source material associated with the layer and rendering the layer immediately;

if no pixel manipulation operations are indicated, determining if a blending mode associated with the layer in the root composition is an associative operation;

if the blending mode is not an associative operation, then sampling the image format source material associated with the layer and rendering the layer immediately;

if the blending mode is an associative operation, then promoting all layers of the composition into the root composition for the rendering process; and sampling the image format source material associated with the layer and rendering the promoted layers in render order in the root composition.

14. A method of delaying the sampling of image format source material associated with a layer in the rendering of the layer, comprising the steps of:

retrieving a layer in a composition;

determining if the layer is a composition;

if the layer is itself a composition, determining if any pixel manipulation operations are designated in the image processing for the layer in the root composition associated with the nested composition;

if no pixel manipulation operations are defined, determining if the blending operation associated with the nested composition's layer in the root composition is an associative operation; and if the blending mode is an associative operation, then promoting all of the layers of the nested composition into the root composition for the rendering process and delaying the sampling of the image format source material associated with the layer and rendering of the promoted layer until called for by the render order in the root composition.

15. A method for delaying the rasterizing of outline format source material associated with a source layer in a nested composition that is a layer in a root composition during the rendering of the root composition, comprising the steps of:

retrieving the source layer; and promoting the source layer to the root layer and delaying the rasterizing of the outline format source material until the root layer is rendered.

16. A method for delaying the sampling of image format source material associated with a source layer in a nested composition that is a layer in a root composition during the rendering of the root composition, comprising the steps of:

retrieving the source layer; and promoting the source layer to the root layer and delaying the sampling of the image format source material until the root layer is rendered.

* * * * *